United States Patent [19]

Albrecht

[11] Patent Number: 5,305,549
[45] Date of Patent: Apr. 26, 1994

[54] METHOD AND APPARATUS FOR DEFLECTING TREE ROOTS, AND COMBINATION OF THE APPARATUS WITH TREE AND STATIC STRUCTURE

[75] Inventor: Leonard N. Albrecht, Irvine, Calif.

[73] Assignee: Deep Root Partners, L.P., Burlingame, Calif.

[21] Appl. No.: 905,761

[22] Filed: Jun. 29, 1992

[51] Int. Cl.⁵ .............................................. A01G 1/00
[52] U.S. Cl. .......................................... 47/33; 47/30; 52/102; 404/7
[58] Field of Search ............... 47/33, 25, 30, 30 OT; 52/102; 404/7, 8

[56] References Cited

U.S. PATENT DOCUMENTS

| 557,030 | 3/1896 | Schaefer | 47/33 |
| 1,423,659 | 7/1922 | Hassel | 47/30 OT |
| 2,784,528 | 3/1957 | Rudenauer | 47/30 OT |
| 3,415,013 | 12/1968 | Galbraith | 47/33 |
| 4,019,279 | 4/1977 | Moorman et al. | 47/25 |
| 4,858,379 | 8/1989 | West | 47/33 |
| 5,070,642 | 12/1991 | Albrecht | 47/25 |
| 5,117,583 | 6/1992 | Reum | 47/33 |

FOREIGN PATENT DOCUMENTS

| 2817238 | 10/1979 | Fed. Rep. of Germany | 47/33 |
| 3023309 | 1/1982 | Fed. Rep. of Germany | 47/33 |

*Primary Examiner*—Henry E. Raduazo
*Attorney, Agent, or Firm*—Richard L. Gausewitz

[57] ABSTRACT

A tree root-control barrier system formed by a plurality of panels having vertical ridges thereon. Then panels are embedded in the earth between a sidewalk and a tree whose roots are to be controlled. Upper and lower cross-members are provided on the panels at their upper edges, and perform various functions including sun protection, protection against lawn trimmers, protection against the growing of tree roots above the ground, and others.

10 Claims, 3 Drawing Sheets

METHOD AND APPARATUS FOR DEFLECTING TREE ROOTS, AND COMBINATION OF THE APPARATUS WITH TREE AND STATIC STRUCTURE

BACKGROUND OF THE INVENTION

Since the basic invention of U.S. Pat. No. 4,019,279, various types of root deflecting panels, etc., have been manufactured and sold for the purpose of deflecting tree roots downwardly so that they will not lift or crack sidewalks, curbs, etc. (called "static structures" or "hardscapes"). These panels are of the type in which spaced parallel ridges or ribs are molded integrally with or (adhesively secured to) body portions. Such body portions, having the ridges thereon, are secured endwise to corresponding body portions of adjacent panels by tongue-in-groove connector portions or elements. Any desired length of the connected panels may be employed, for example along a sidewalk or curb, or around a tree of any size.

Let it be assumed, for example, that the roots of one or more trees growing in a yard have lifted or cracked sections of a sidewalk. The lifted or broken sections of the sidewalk are removed, as are the offending roots, and a narrow trench is dug adjacent the edge of replacement sidewalk sections. This is preferably done by a special tool that not only trenches but also root prunes (cuts) the roots. Thereafter, connected sections of panel are dropped into the trench. There are, however, problems both at the time of inserting the connected panels and for years thereafter while the panels are doing their job of deflecting roots downwardly.

It is important that the upper edges of the connected inserted panels be sufficiently high that roots may not grow thereover. For example, if such an upper edge were slightly below the surface of the earth (grade), a tiny root could grow thereover and then (for example concealed by grass adjacent the sidewalk edge) grow beneath a sidewalk. Thereafter, such root could grow progressively larger and larger until sidewalk lifting or cracking could result.

Relative to the long time period after the connected panel elements have been embedded in the earth, if the upper edge is substantially above grade there can follow various undesirable results. One is that the upper edge is exposed to ultraviolet light from the sun, which can eventually degrade the synthetic resin edge so that it cracks off when stepped on (for example). In addition, the edge is relatively thin and can be damaged by the high-velocity rotating lines of "trimmers" (such as "WEED EATER" tools). Another problem is that the exposed upper edge has no appearance of solidity or effectiveness, which can cause users to believe that the root barrier is not being effective whereas in fact it is. Another problem is that an exposed thin edge of a panel may cut the feet of children at play.

A further problem relates to possible fraud by persons installing the root deflector panels in the earth between the trees and the static structures (hardscapes). If a root deflector panel is cut in half longitudinally, thus providing two elongate root-deflector half-strips each having a vertical dimension (when installed) approximately half that of the original strip, fraud can occur with very little likelihood of detection. Thus, the uncut edge of each of the two strips is caused to be slightly above the ground, and the rest of the half-strip is buried in the earth. Unless the supervisor or owner digs down and tests at various points to see whether or not a full-depth strip has been used, it is probable that the fraud will not be detected until many years later.

SUMMARY OF THE INVENTION

All of the above problems are solved by the present invention, which includes providing a rail in the form of two parallel and vertically-spaced cross-members on the upper edges of panels, preferably in integral relationship therewith. The lower cross-member extends longitudinally of the upper panel edge portion between the various ridges or ribs. The upper cross-member is spaced somewhat above the lower one and directly thereover, so that there is at least one groove—on the tree side of the barrier—between the upper and lower cross-members.

In the combination and method of the invention, the lower side of the lower cross-member is seated on the surface of the earth (at grade) and therefore provides a precise reference so that there is no guesswork relative to how high the upper edge of each of the connected barriers should be. Then, the upper cross-member is automatically disposed a slight distance above the lower cross-member, with the above-indicated groove therebetween.

The following results then occur. Roots growing along the surface of the earth from the tree toward the panel (and toward the sidewalk, etc., on the opposite side of the panel from the tree) grow beneath the lower cross-member and engage the panel region thereberneath. Then, they cannot grow upwardly because they are prevented from so doing by the underside of the lower cross-member. Instead, they grow sideways, that is to say horizontal and parallel to the cross member. This only continues until they engage a vertical ridge or rib, at which time they grow downwardly along such vertical ridge or rib to a depth equal to that of the lower edge of the control barrier. They are then free to grow horizontally toward the sidewalk but at a sufficient depth that, even when they become large, they will not lift or crack such sidewalk.

In the event that the connected control-barrier panels were not all embedded to the precise desired depth described above, despite the reference and "stop" action created by the lower surface of the lower cross-member, and if the connected control barriers are at one or more regions excessively low in the earth, one or more roots may grow above the lower cross-member. Then, however, they enter the groove between upper and lower cross members and turn horizontally. They grow horizontally along the groove instead of growing toward the sidewalk.

The upper cross-member acts as a shade member that largely shields the lower cross-member from the rays of the sun, so that even if the upper cross-member eventually suffers some ultraviolet deterioration the lower one will not. The upper cross-member is also sufficiently wide to protect the feet of children, and to give an appearance of solidity and effectiveness to the control barrier structure. The upper cross-member effectively protects the lower one from lawn trimmers, and is itself sufficiently strong that it will not normally be damaged by such trimmers.

In accordance with another aspect of the invention, the root-deflector apparatus and method are such that if the strip is cut substantially in half, in a horizontal plane, and is then embedded in the earth, the fraud will soon be realized by the supervisor or owner. Thus, as a practical matter, the chances of such fraud occurring in the installation of root-deflector elements is substantially zero.

DETAILED DESCRIPTION OF THE PREFERRED EMBODIMENTS

For background information and some disclosure, reference is made to the above-specified U.S. Pat. No. 4,019,279, issued Apr. 26, 1977. Said patent is hereby incorporated by reference herein.

In the present specification and claims, the words "inner surface", "inner side", etc., of a panel or barrier denote that side closest to the tree whose roots are being guarded against. Conversely, the "outer surface", etc., of the panel (or barrier) is that side farthest from such tree.

It is preferred, but not essential, that each panel be identical to each other panel. In the panels described in the present specification, such is the case.

Figure 2:
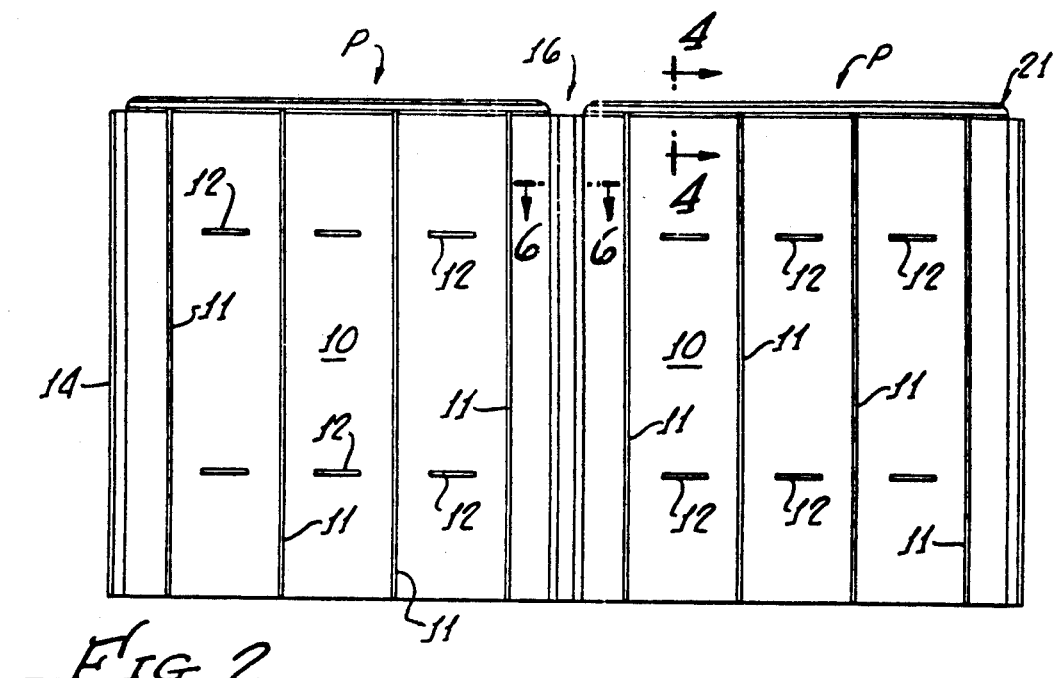
FIG. 2 is a side elevational view showing two control-barrier panels, incorporating the present invention, as connected to each other.

As shown in FIG. 2, each root-control barrier panel P is square or rectangular, and may be horizontally or vertically elongate. Each panel P is formed of such material, and has a thickness such that, it may not be penetrated by tree roots. Preferably, each panel is a sheet 10 of synthetic resin having a thickness of about 0.080 inch. One side of the sheet is preferably devoid of protuberances, while the other side of each panel has a plurality of spaced vertical ridges (ribs) 11. Preferably, the ridges are spaced about six inches apart, are 0.060 inch thick, and extend perpendicularly to the surface of the panel for about one-half inch. The inner surface of each panel is smooth.

In the best mode, there are horizontal ledges 12 disposed between ridges 11 and spaced vertically relative to each other. Such ledges are ground locks adapted to be engaged by tree roots, on the upper surfaces of the ledges, so that the tree roots prevent such ledges and thus the panel from moving upwardly in the earth. Reference is made to U.S. Pat. No. 5,070,642, which is hereby incorporated by reference herein.

Each panel has a height, preferably, of about twelve inches, or about eighteen inches or more. Preferably, each panel is injection molded of polyethylene, or polypropylene.

Figure 6:
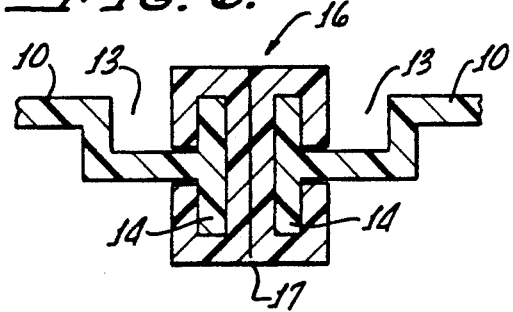
FIG. 6 is an enlarged horizontal fragmentary sectional view on line 6—6 of FIG. 2, showing connector elements between adjacent panels.

As shown in FIG. 6, each end of each panel is formed integrally with a vertical channel 13 and vertical double-flange 14 for use in connecting adjacent panels P together. The flanges 14 and channels 13 are associated with connectors 16 in the form of two channel-like elements that, in the preferred embodiment, are secured to each other at a living hinge 17. Stated otherwise, two substantially closed channels are connected to each other at a living hinge 17 and are adapted to be slid simultaneously over the double flanges 14 of adjacent panels 13, to connect the adjacent panels together in a manner such that the panels may be selectively in the same plane or different planes. Reference is made to my copending patent application Ser. No. 07/682,581, filed May 8, 1991, which application is hereby incorporated by reference herein.

Figure 7:
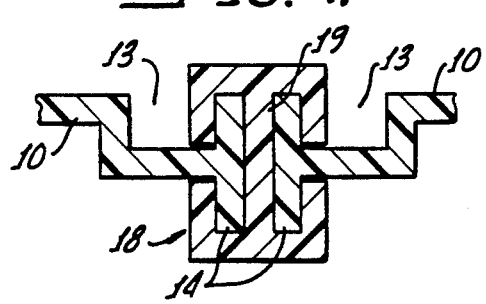
FIG. 7 corresponds to FIG. 6 but shows a rigid connector between panels.

Referring to FIG. 7, another end connector construction is shown which does not have any capability of permitting the adjacent ends of panels P to get out of the same plane. This connector, numbered 18, is an extrusion formed of two substantially closed channels having a rigid wall 19 therebetween and forming part of each of the channels.

FURTHER DESCRIPTION OF APPARATUS COMBINATION OF THE INVENTION

Figure 4:
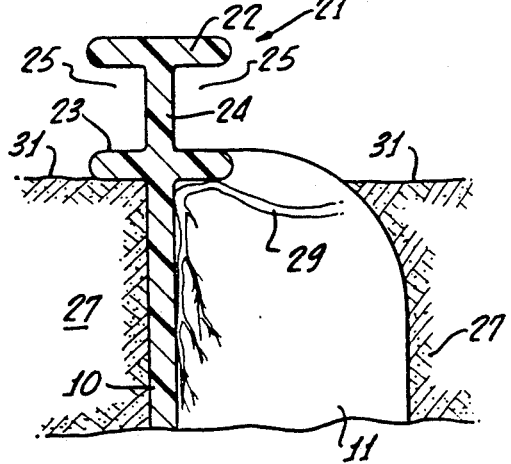
FIG. 4 is a greatly enlarged fragmentary vertical sectional view on line 4—4 of FIG. 2, but showing the panel embedded in the earth as illustrated in FIG. 1.
Figure 3:
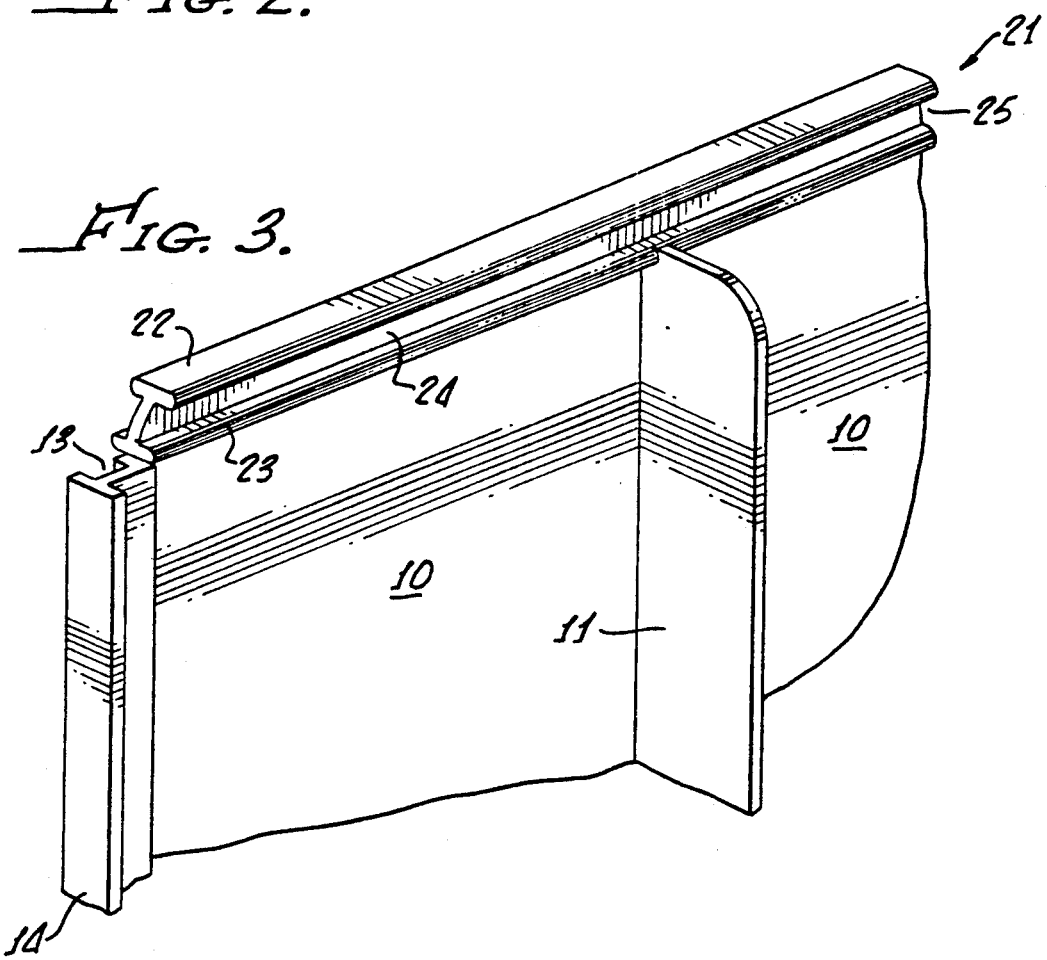
FIG. 3 is an isometric view of the upper-left portion of the construction shown in FIG. 2, the showing being enlarged in order to illustrate the cross-members.

As best shown in FIGS. 2-4, a double rail 21 is molded integrally on the upper edge of sheet 10, in parallel relationship to the longitudinally axis of the connected panels P. Double rail 21 has an upper cross-member 22 and a lower cross-member 23 separated by a vertical web 24. Web 24 lies in the same plane as that of sheet 10, whereas each cross-member 22, 23 lies in a horizontal plane perpendicular to such vertical plane.

Each cross-member 22, 23 is formed of two coplanar flanges, one extending to the right from vertical member 24 (FIG. 4), and the other extending to the left therefrom. As shown, the outer edges of each cross-member are rounded.

In the preferred embodiment, the width of each upper rail or cross-member 22 is ⅜ inch. The lower rail or cross-member 23 has the same dimension. The vertical distance between the underside of upper cross-member 22 and the upper side of lower cross-member 23 is ¼ inch. The vertical thickness of each rail or cross-member 22, 23 is 0.060 inch or 0.070 inch. These dimensions are given by way of illustration, not limitation.

Channels 25 are formed on each side of vertical member 24, since member 24 (preferably) has the same thickness as that of sheet 10 whereas each cross-member 22, 23 has a width greater than the thickness of web 24 or of sheet 10.

Figure 1:
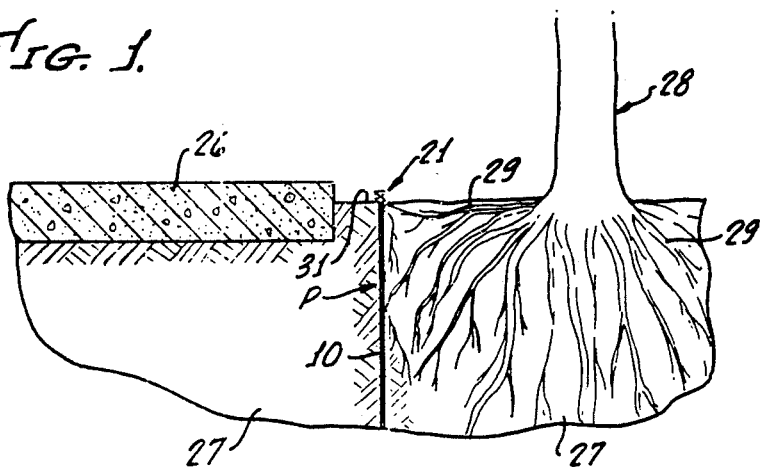
FIG. 1 is a vertical sectional view showing a section of earth containing tree roots, a control barrier panel, and a sidewalk.

Referring next to FIG. 1, the combination of the invention further comprises a sidewalk 26 or other static structure (hardscape) which is supported in the earth 27 in spaced relationship from a tree 28 that is growing in the earth 27. Tree 28 is of a type having roots 29 capable of growing beneath sidewalk 26 and lifting and/or cracking it.

The panel P is disposed vertically in the earth, with the lower surface of lower cross-member 23 resting upon the upper surface 31 of the earth (namely, at grade). Then, as shown in FIG. 4, upper cross-member 22 is disposed a predetermined short distance above lower cross-member 23. Upper cross-member 22 performs the various functions stated above, namely sun protection so as to retard greatly deterioration of the synthetic resin, protection against trimmers, prevention of cutting of the feet of children, etc., etc. Lower cross-member 23 seats on the grade surface 31 and acts as a stop to determine the precise elevation of the panel P in the earth--making sure that the upper cross-member 22 is at the same desired elevation above grade 31.

Very importantly, the lower cross-member 23 insures that surface-growing roots remain at or below the surface (grade 31) in almost all cases. For example, referring to FIG. 4, if a root 29 from tree 28 goes into a region of sheet 10 of a panel P adjacent a rib or ridge 11, the root 29 cannot turn upwardly because of cross-member 23, but will instead turn downwardly to grow down in the region where ridge 11 meets the inner surface of sheet 10. Only when the root grows downwardly to the bottom edge of the panel P may it grow horizontally beneath the panel. However, it is then so far beneath the sidewalk 26 that enlargement of the root over time will not lift or damage the sidewalk.

Figure 5:
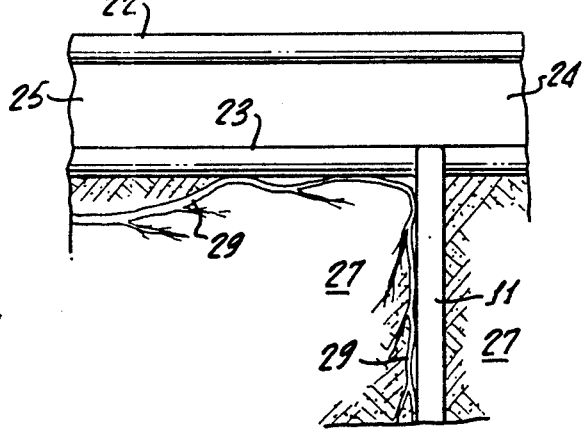
FIG. 5 is a side elevational view of the showing of FIG. 4.

As another example, and referring to FIG. 5, a root 29 from tree 28 engages sheet 10 at a region spaced a substantial distance from a ridge 11. The root will then turn laterally and grow along the sheet 10 toward a ridge 11. The root may turn horizontally in either direction, but regardless of which way it turns it will grow into a ridge 11. As it grows toward a ridge, it may grow upwardly as shown in FIG. 5 but will then engage the underside of lower cross-member 23 instead of, in some cases, growing above grade 31. Eventually, the root engages a ridge 11 and grows downwardly as shown in FIG. 5.

If an occasional root 29 grows above lower cross-member 23 it will merely enter that channel 25 which is facing tree 28. It will grow along the channel 25 until eventually it dies, being prevented by the upper cross-member 22 from penetrating to the side of panel P remote from tree 28.

In the absence of the present invention, the upper horizontal edge of a series of connected panels was typically slightly above grade. Such edge was fully exposed to ultraviolet radiation from the sun, and its exact elevation above grade varied substantially because there was no positive ground-engagement and spacer means to determine the elevation precisely.

Such upper edge of prior-art panels looked very insubstantial to the home owner or city-employed arborist who contracted for the job. On occasion, the barrier may have been even more insubstantial than the arborist or home owner believed, because a fraudulent installer could cut the strip of connected panels in half horizontally (along generally the horizontal axis of the connected panels). In such a situation, and unless the arborist or home owner dug into the earth at spaced points along the elongate strip of panels, there was no way of telling whether or not the full uncut panel was present in the earth or whether the thing present was just about half a strip.

It is emphasized that if a string of panels not incorporating the present invention is cut in half horizontally, there are two clean uncut edges. One is the upper, and the other is the lower. Thus, it was possible for a fraudulent installer to take the upper one of the cut half-strips and embed it with the clean upper edge uppermost. Simultaneously, he could take the lower portion of the cut strip and turn it over and embed it so that the uncut lower edge became the upper edge and was visible above ground.

With the present invention, on the other hand, it does no good for any installer to cut any string of panels horizontally, because there is only one rail 21 and that is above the ground where it is readily viewed.

DESCRIPTION OF THE METHOD

Let it be assumed that a sidewalk 26 (for example) is already in place. A narrow trench is then dug along the edge of sidewalk 26, to the desired depth such as twelve, eighteen, or twenty-four inches. If a tree (such as tree 28) is already in place and has roots that extend beneath the sidewalk 26, the trench-digging operation is so conducted as to cut the tree roots and thus achieve desired root pruning. If no tree is already in place, a subsequent step in the method comprises planting a tree or trees in the earth 27 on the side of panel P remote from the sidewalk 26, but sufficiently close to the sidewalk that (in the absence of the panel P) roots from the tree would grow beneath the sidewalk.

A substantial number of panels P are then connected together by the connector elements 16 shown in FIG. 6. The narrow trench is then backfilled with earth up to the grade level 31 and is compressed as by being packed. The operation is so conducted that the lower surface of lower cross-member 23 is at grade 31 as shown and described relative to FIG. 4. By reference to the grade level in the original soil adjacent the narrow trench, the operator can readily see what the grade should be after the trench has been backfilled—namely, it should be the same as the original grade. By grasping the upper cross-member 23 at appropriate times during the backfilling or packing operations, the operator readily adjusts the elevation of the string of connected panels P so that the lower cross-member 23 is resting on grade 31.

APPARATUS AND METHOD OF A SECOND EMBODIMENT OF THE INVENTION

Except as specifically stated below, the apparatus and method of the second embodiment are identical to what is described above, and shown in the drawings, relative to the embodiment of FIGS. 1-7, inclusive. Thus, relative to the second embodiment only those elements that are different from the embodiment of FIGS. 1-7 are shown and described. Except relative to the differences, the statements made above (prior to the present subheading) are applicable here also, and are therefore incorporated here by reference.

Figure 8:
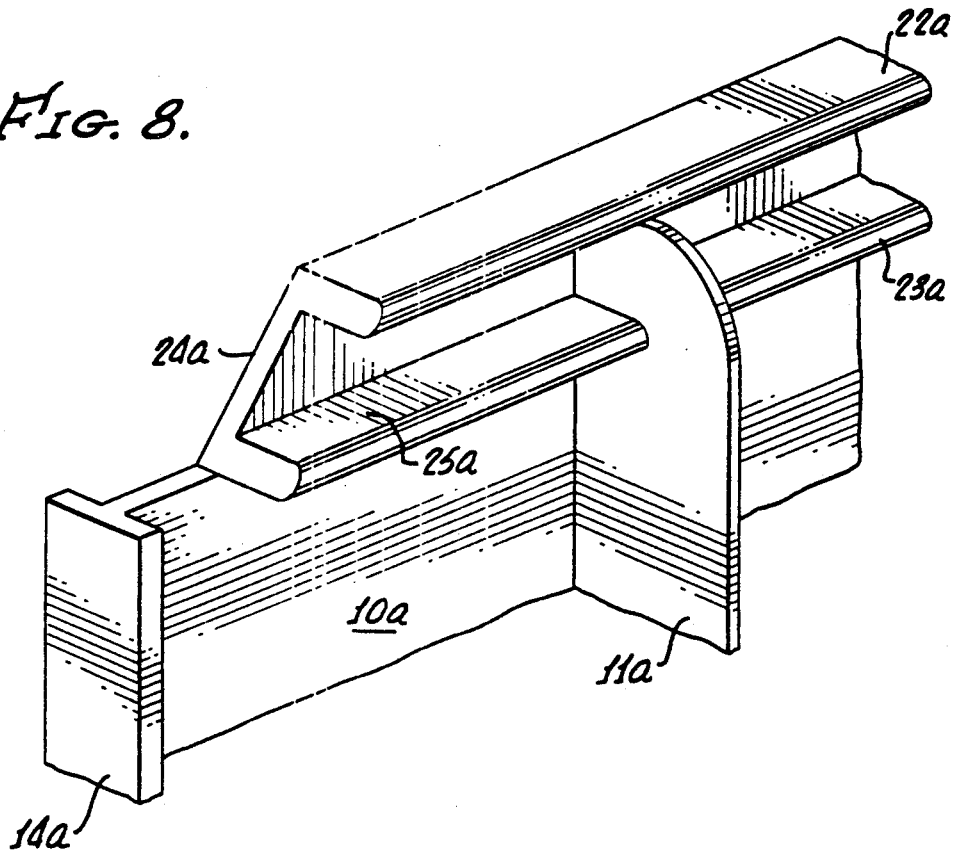
FIG. 8 is a fragmentary isometric view corresponding to the upper-left portion of FIG. 3, but showing a second embodiment.
Figure 9:
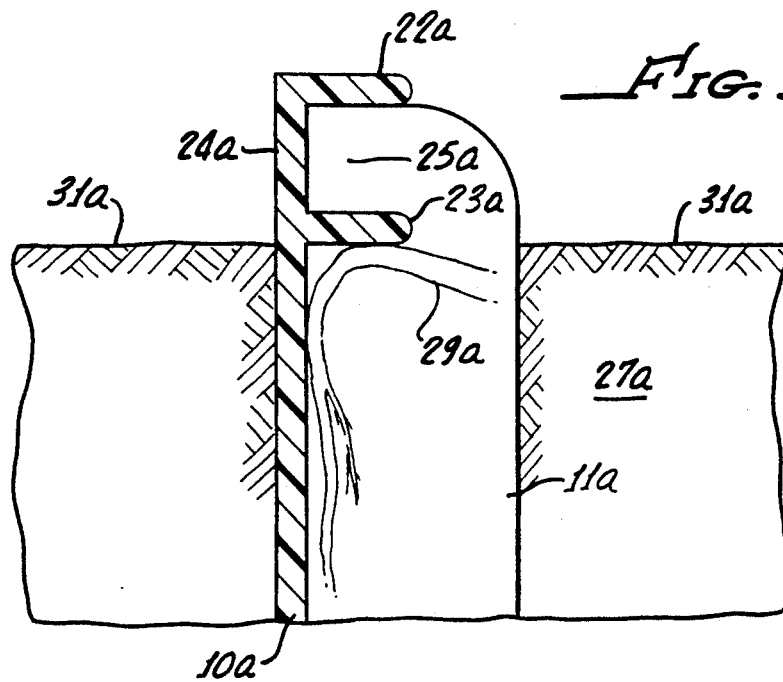
FIG. 9 is a view corresponding to FIG. 4, but showing said second embodiment.

The differences are shown by FIGS. 8 and 9, which illustrate portions of the apparatus of the second embodiment.

Elements in FIGS. 8 and 9 which "correspond" to elements in FIGS. 1-7 are given the same reference numerals, except followed in each instance by the letter "a". This is done without prejudice to the fact that most of the elements of FIGS. 8 and 9 are different from those of FIGS. 1-7. The embodiment of FIGS. 8 and 9 is the preferred embodiment.

Upper cross-member 22a and lower cross-member 23a are each on one side of sheet 10a. Stated otherwise, cross-members 22a, 23a extend inwardly from sheet 10a and from web 24a. Preferably, the amount of such inward extension is about equal to the full widths of cross-members 22, 23 as shown in FIG. 4. Thus, the groove 25a between the cross-members 22a, 23a (FIGS. 8 and 9) is substantially deeper than either groove 25 (FIG. 4). Each ridge or rib 11a preferably extends up to upper cross-member 22a, as shown, being integral therewith.

There is, as illustrated in FIG. 8, preferably no channel adjacent flange 14a.

In performing the method using the embodiment of FIGS. 8 and 9, previously-described method steps are performed, following which the root-control barrier is embedded in the earth 27a to the depth of the lower surface of lower cross-member 23a—which act as a stop means. Upper cross-member 22a then shields lower cross-member 23a and one side of web 24a from the sun, and performs the other advantages functions described above.

The lower cross-member being relatively wide, it is especially effective in preventing a root, such a root 29a, from growing above grade 31a. Any root that does get above the lower cross-member 23a enters groove 25a, soon engages a ridge 11a, and dies.

It is emphasized that the panels are so oriented that the cross-members 22a, 23a extend toward the tree 28 whose roots are to be guarded against.

The foregoing detailed description is to be clearly understood as given by way of illustration and example only, the spirit and scope of this invention being limited solely by the appended claims.

What is claimed is:

1. A root-control barrier panel for embedment in the earth between a static structure and a tree whose roots may damage said static structure, said panel comprising:
   (a) a generally rectangular planar sheet of synthetic resin having an upper edge and a lower edge, and having end edges perpendicular to said upper and lower edges,
   (b) ridge means provided on one side of said sheet and extending generally perpendicular to said upper and lower edges,
   (c) means to connect said end edges of said sheet to end edges of other root-control barrier panels, and
   (d) a double rail provided on said sheet along said upper edge and extending parallel thereto,
       said double rail comprising upper and lower cross-members that are substantially parallel to each other and are vertically spaced a short distance from each other
       said upper cross-member having a cross-sectional shape such that portions thereto extend in both directions away from the plane of said sheet, said upper cross-member shading said lower cross-member from sun, said upper cross-member protecting said lower cross-member from lawn trimmers.

2. A root-control barrier panel for embedment in the earth between a static structure and a tree whose roots may damage said static structure, said panel comprising:
   (a) a generally rectangular planar sheet of synthetic resin having an upper edge and a lower edge, and having end edges perpendicular to said upper and lower edges,
   (b) ridge means provided on one side of said sheet and extending generally perpendicular to said upper and lower edges,
   (c) means to connect said end edges of said sheet to end edges of other root-control barrier panels, and
   (d) a double rail provided on said sheet along said upper edge and extending parallel thereto,
       said double rail comprising upper and lower cross-members that are substantially parallel to each other and are vertically spaced a short distance from each other
       said upper cross-member having a cross-sectional shape such that portions thereto extend in both directions away from the plane of said sheet, said upper cross-member shading said lower cross-member from sun, said upper cross-member protecting said lower cross-member from lawn trimmers, said lower cross-member being provided on at least the same side of said sheet as is said ridge means, said lower cross-member preventing adjacent tree roots from growing above the earth, said lower cross-member being adapted to be located at grade and to cause said upper cross-member to be located a predetermined distance above grade.

3. A root-control barrier panel for embedment in the earth between a static structure and a tree whose roots may damage said static structure, said panel comprising:
   (a) a generally rectangular planar sheet of synthetic resin having an upper edge and a lower edge, and having end edges perpendicular to said upper and lower edges,
       said sheet having a front side and a back side that are parallel to each other,
   (b) ridge means provided on one side of said sheet and extending generally perpendicular to said upper and lower edges,
   (c) means to connect said end edges of said sheet to end edges of other root-control barrier panels,
   (d) a double rail provided on said sheet along said upper edge and extending parallel thereto,
       said double rail comprising upper and lower cross-members that are substantially parallel to each other and are vertically spaced a short distance from each other,
   (e) said upper and lower cross-members each having a cross-sectional shape such that it extends in only one direction away from the plane of said sheet,
       said upper cross-member shading said lower cross-member from sun, said upper cross-member protecting said lower cross-member from lawn trimmers, said lower cross-member being provided on at least the same side of said sheet as is said ridge means, and as is said upper cross-member, said lower cross-member preventing adjacent tree roots from growing above the earth, said lower cross-member being adapted to be located at grade and to cause said upper cross-member to be located a predetermined distance above grade.

4. A combination to prevent damage to static structures by tree rots, said combination comprising:
   (a) a static structure is disposed in or on the earth,
   (b) a tree planted in the earth relatively near said static structure,
       said static structure and said tree being of such types and so located that, in the absence of a barrier between said tree and static structure, the roots of said tree would tend to damage said static structure as said roots mature, and
   (c) a barrier embedded in the earth generally between said tree and static structure for the purpose of preventing said damage,
       said barrier comprising a plurality of generally planar panels formed of sheet material adapted to and having a thickness adapted to prevent penetration of tree roots therethrough, each of said panels being rectangular or square,
each of said panels having an upper edge,
said barrier further comprising a plurality of joint means provided to connect said panels together and to prevent tree roots from penetrating between said panels,
said barrier further comprising rail means provided at the upper edges of said panels parallel thereto,
said rail means having an upper side,
said upper side of said rail means being above grade,
said rail means comprising upper and lower cross-members vertically spaced a short distance from each other.

5. The invention as claimed in claim 4, in which each of said panels is formed of a sheet of synthetic resin, and in which said cross-members have cross-sectional shapes and dimensions such that said cross-members are much wider than the thickness of said sheet.

6. The invention as claimed in claim 4, in which said panels have vertical ridges on one side thereof.

7. The invention as claimed in claim 4, in which the bottom edges of said panels are plain, having no rail means or other means thereof, but instead being merely an edge of the panel.

8. The invention as claimed in claim 4, in which said upper and lower cross-members extend from and are disposed on only one side of said sheet material.

9. The invention as claimed in claim 4, in which said panel is thin and is formed of polyethylene.

10. The invention as claimed in claim 4, in which said panel is thin and is formed of polypropylene.

* * * * *

UNITED STATES PATENT AND TRADEMARK OFFICE
CERTIFICATE OF CORRECTION

PATENT NO. : 5,305,549
DATED : April 26, 1994
INVENTOR(S) : Leonard N. Albrecht

It is certified that error appears in the above-indentified patent and that said Letters Patent is hereby corrected as shown below:

Claim 3 (column 8, line 26), delete "side" and substitute therefor ---of said sides---.

Claim 4 (column 8, line 53), delete "rots" and substitute therefor ---roots---.

Claim 4 (column 8, line 54), delete "is".

Signed and Sealed this

Eleventh Day of October, 1994

Attest:

BRUCE LEHMAN

*Attesting Officer*    *Commissioner of Patents and Trademarks*